United States Patent Office 3,243,450
Patented Mar. 29, 1966

3,243,450
HYDROXYMETHYLPHOSPHINES AND PROCESS FOR PREPARING THE SAME
Martin Grayson, Norwalk, Conn., assignor to American Cyanamid Company, Stamford, Conn., a corporation of Maine
No Drawing. Filed Dec. 26, 1963, Ser. No. 333,696
15 Claims. (Cl. 260—465.6)

This application is a continuation-in-part of U.S. application Serial No. 27,511, filed May 9, 1960, and now abandoned.

The present invention relates to tetrakis(hydroxymethyl)phosphonium halide derivatives and methods of preparing same.

As stated in the Flynn et al. patent, U.S. 2,743,299, issued April 24, 1956, tetrakis(hydroxymethyl)phosphonium chloride, i.e., THPC, is a valuable polyfunctional compound useful as an intermediate for the production of numerous compounds and compositions. Flynn et al. prepared THPC by the following reaction:

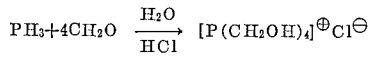

$$PH_3 + 4CH_2O \xrightarrow[HCl]{H_2O} [P(CH_2OH)_4]^{\oplus} Cl^{\ominus}$$

In 1930 A. Hoffman, Journal of the American Chemical Society, 52, 2995, disclosed the following reaction:

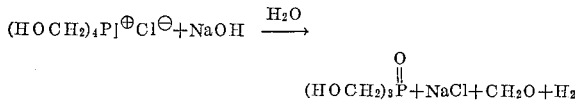

$$(HOCH_2)_4P]^{\oplus}Cl^{\ominus} + NaOH \xrightarrow{H_2O}$$
$$(HOCH_2)_3\overset{O}{\overset{\|}{P}} + NaCl + CH_2O + H_2$$

As taught in the equation, tris(hydroxymethyl)phosphine oxide is the principal Hoffman product.

Quite surprisingly, it has been found pursuant to the instant discovery that by proper control of conditions the hydroxymethyl phosphine derivatives of THPC, and the like, rather than the hydroxymethyl phosphine oxide derivatives, may be produced. According to the present invention a hydroxymethyl phosphonium salt of the formula

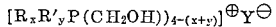

$$[R_xR'_yP(CH_2OH)]_{4-(x+y)}]^{\oplus}Y^{\ominus}$$

is brought into reactive contact, in the presence of a member selected from the group consisting of water and a lower aliphatic alcohol, with a base, said base being present in the reaction mixture in an amount no greater than about a stoichiometric quantity throughout substantially all of the reaction; the corresponding hydroxymethyl phosphine having the formula $$R_xR'_yP(CH_2OH)_{3-(x+y)}$$

is recovered; R and R' in the above formulae represent members selected from the group consisting of branched and straight chain alkyl ($C_1$–$C_{20}$), branched and straight chain alkenyl ($C_2$–$C_{20}$), cycloalkyl, cycloalkenyl and phenyl; said alkyl, alkenyl, cycloalkyl, cycloalkenyl, and phenyl moieties being substituted or unsubstituted, as will be seen hereinafter; R and R' may be the same or different; x is selected from 0 and 1; y is selected from 0 and 1; and Y is a mineral acid residue, i.e., a mineral acid anion.

Pursuant to a further embodiment of the present invention a hydroxymethyl phosphine of the formula

$$R_qP(CH_2OH)_{3-q}$$

and an alkyl ($C_1$–$C_{20}$) halide of the formula $$R''X$$

are brought into reactive contact and the corresponding hydroxymethyl phosphine halide recovered, said halide having the formula

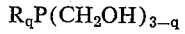

$$[R''R_qP(CH_2OH)_{3-q}]^{\oplus}X^{\ominus}$$

R in the latter two formulae represents a member selected from the group consisting of branched and straight chain alkyl ($C_1$–$C_{20}$), branched and straight chain alkenyl ($C_2$–$C_{20}$), cycloalkyl, cycloalkenyl, phenyl; said alkyl, alkenyl, cycloalkyl, cycloalkenyl and phenyl moieties being substituted or unsubstituted, as will be seen hereinafter; R'' is alkyl from 1 to 20 carbon atoms; X is halogen; and q is selected from 0, 1, and 2.

A wide variety of temperatures may be employed in each of the reactions just given. Best results are obtained at a temperature in the range of $-20°$ C. to $100°$ C., preferably $0°$ C. to $80°$ C.

Typical bases within the purview of the present discovery are the oxides, hydroxides, lower alkoxides and carbonates of alkali metals and alkaline earth metals. Included among these are, for example, NaOH, $Na_2CO_3$, $NaHCO_3$, CaO, BaO, $NaOC_2H_5$, $NaOC_3H_7$-i, and the like. Generally these bases are present in a concentration sufficient to provide a final H ion concentration in the range of pH 4 to pH 9. Other bases within the purview of the instant discovery are tertiary alkyl amines, tertiary aralkyl amines and tertiary heterocyclic amines, such as triethylamine, N,N-dimethylaniline, pyridine, and other similar strongly basic organic tertiary amines.

As indicated hereinabove, the bases are present in the reaction mixture in an amount no greater than about a stoichiometric quantity throughout substantially all of the reaction, based on the phosphonium salt reactant. Best control of concentration may be had by simply adding the base to the phosphonium salt reactant, thus permitting a stoichiometric excess of the phosphonium salt throughout substantially all of the reaction. However, other methods of admixing the reactants are contemplated, such as impinging streams of reactants, and the like.

The solvents contemplated herein are selected from the group consisting of water and lower alkyl alcohols such as methanol, ethanol, propanol, isopropanol and butanol. It has been found that when a lower alkyl alcohol is used as a solvent, the method of addition of the reactants is not as critical; however, best results are achieved by adding the base to the phosphonium salt and maintaining the base concentration in an amount no greater than about stoichiometric quantity, based on the phosphonium salt reactant.

The embodiment discussed hereinabove wherein a hydroxymethyl phosphine of the formula

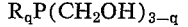

$$R_qP(CH_2OH)_{3-q}$$

is reacted with an alkyl halide (R''X) is not restricted to any particular sequence of addition and is generally carried out in the presence of an inert organic solvent, such as water, lower alkanols, and other inert organic polar solvents, such as acetonitrile, and the like. The ratio of reactants, likewise, is not critical and is governed only by practicality and ease of operation.

All of the reactions contemplated herein may be carried out in batch, continuous or semi-continuous processes. By the same token, while good results are achieved at atmospheric pressure, super-atmospheric and sub-atmospheric pressures are contemplated.

Hydroxymethyl phosphines corresponding to the formula

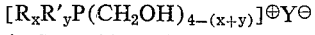

$$[R_xR'_yP(CH_2OH)_{4-(x+y)}]^{\oplus}Y^{\ominus}$$

above, wherein R and/or R' are phenyl, substituted or unsubstituted, and Y is halogen may be prepared by reacting the corresponding substituted or unsubstituted phenylphosphine or diphenylphosphine with formaldehyde and a hydrohalide in the presence of water according to the following equation:

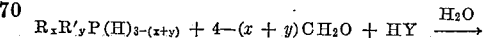

$$R_xR'_yP(H)_{3-(x+y)} + 4-(x+y)CH_2O + HY \xrightarrow{H_2O}$$
$$[R_xR'_yP(CH_2OH)_{4-(x+y)}]^{\oplus}Y^{\ominus}$$

wherein R and R' represent phenyl, substituted or unsubstituted, Y is halogen and $x$ and $y$ have the meanings given above.

This reaction is carried out at a temperature in the range of 0° C. to 50° C., in a batch, continuous or semi-continuous manner, and at sub-, super- or atmospheric pressures.

The present invention will best be understood by virtue of the following examples:

*Example I.—Tris(hydroxymethyl)phosphine*

Purified tetrakis(hydroxymethyl)phosphonium chloride (THPC, 2.0 grams, 0.01 mole) of melting point 149° C.–150° C. is dissolved in 30 milliliters of absolute ethanol and 0.45 gram (0.01 mole) of sodium hydroxide dissolved in 20 milliliters of absolute ethanol is added all at once at ambient temperature (23° C.) in a nitrogen atmosphere with stirring. No gases are evolved but the precipitated sodium chloride is filtered and the filtrate stripped of solvent (in the absence of air) to a residual fluid. The infrared absorption spectrum indicates absence of phosphine oxide groups and characteristic peaks expected for tris(hydroxymethyl)phosphine. The residue is redissolved in ethanol and treated with an ethanol solution of 1.1 grams (0.01 mole) of freshly crystallized benzoquinone. The orange adduct is analyzed—calculated for $C_9H_{13}PO_5$: C, 46.56; H, 5.60. Found: C, 46.34, H, 4.40.

*Example II.—Tris(hydroxymethyl)phosphine*

A solution of 7.6 grams (0.04 mole) of THPC in 50 milliliters of water at 28° C. is treated under nitrogen with a solution of 1.6 grams (0.04 mole) of sodium hydroxide in 25 milliliters of water in a period of 1–5 minutes with stirring. No gas evolution is observed after stirring 2 hours at this temperature or after standing overnight in the closed system. The water is removed by pumping at 50° C.–60° C. and the residue is extracted with 50 milliliters of absolute ethanol to remove sodium chloride. The residue after removal of ethanol under nitrogen weighs 4.8 grams or 97 percent of theoretical for tris(hydroxymethyl)phosphine. Infrared analysis indicates a substantially pure product, free of tertiary phosphine oxide contaminant. Treatment with excess methyl iodide gives a syrupy methiodide; calculated for $C_4H_{12}PO_3I$: I, 47.70. Found I, 47.2.

*Example III.—Bis(hydroxymethyl)methylphosphine*

A solution of 26.6 grams (0.10 mole) of tris(hydroxymethyl)methylphosphonium iodide in 75 milliliters of absolute ethanol is allowed to react under nitrogen with a solution of 2.3 grams (0.10 gram atom) of sodium in 75 milliliters of absolute ethanol at 0° C. No gases are produced and the residual liquid, after removal of solvent and inorganic salts, gives an infrared spectrum similar to that of tris(hydroxymethyl)phosphine with the addition of methyl group absorptions. This residue has boiling point 67° C.–69° C. at 0.5 millimeter of mercury and is identified by molecular weight and mass spectrometric analysis as bis(hydroxymethyl)methylphosphine.

*Example IV.—(Hydroxymethyl)diphenylphosphine*

A solution of 49.4 grams (0.20 mole) of bis(hydroxymethyl)diphenylphosphonium chloride in 100 milliliters of water is treated under nitrogen at 24° C. with a solution of 4.0 grams (0.10 mole) of sodium hydroxide in 25 milliliters of water. After evaporation of water under vacuum, the product (hydroxymethyl)diphenylphosphine is extracted from starting material and inorganic salts with benzene and is separated from the extractant and purified.

*Example V.—Cyclohexylbis(hydroxymethyl)phosphine*

A solution of 0.10 mole of cyclohexyltris(hydroxymethyl)phosphonium chloride in 100 milliliters of n-butanol is allowed to react with a solution of 0.10 gram atom of sodium in 100 milliliters of n-butanol at 50° C. in a nitrogen atmosphere. After filtration of insoluble sodium chloride and removal of solvent by vacuum evaporation, the product cyclohexylbis(hydroxymethyl)phosphine is recovered.

*Examples VI–XXIII*

The following examples are carried out in every essential respect as in Example I, above, except as indicated in Table I.

TABLE I $$[R_xR'_yP(CH_2OH)_{4-(x+y)}]^{\oplus}Y^{\ominus} + \text{base} \longrightarrow R_xR'_yP(CH_2OH)_{3-(x+y)}$$

| Example No. | Phosphonium salt | Base | Molar ratio, salt:base | Solvent | Temp., °C. | Product |
|---|---|---|---|---|---|---|
| VI | Tris(hydroxymethyl)methylphosphonium iodide. | NaOH | 1:1 | 2-propanol | 23 | Bis(hydroxymethyl)methylphospine. |
| VII | 2-cyanoethyl-tris(hydroxymethyl)phosphonium bromide. | Ca(OH)$_2$ | 1:1 | H$_2$O | 70 | 2-cyanoethyl-bis(hydroxymethyl)phosphine. |
| VIII | 3-butenyl-tris(hydroxymethyl)phosphonium bromide. | Triethylamine | 1:1 | Propanol | 29 | 3-butenyl-bis(hydroxymethyl)phosphine. |
| IX | Bis(hydroxymethyl)dioctylphosphonium sulfate. | NaOC$_2$H$_5$ | 1:1 | Butanol | 23 | Bis(hydroxymethyl)dioctylphosphine. |
| X | Dodecyl-tris(hydroxymethyl)phosphonium phosphate. | NaOi-Pr | 1:1 | Methanol | 20 | Dodecyl-bis(hydroxymethyl)phosphine. |
| XI | 4-ethoxybutyl-tris(hydroxymethyl)phosphonium chloride. | CaO | 1:1 | H$_2$O | 25 | 4-ethoxybutyl-bis(hydroxymethyl)phospine. |
| XII | 3-hydroxycyclohexyl-tris(hydroxymethyl)phosphonium iodide. | Na$_2$CO$_3$ | 1:1 | H$_2$O | 20 | 3-hydroxycyclohexyl-bis(hydroxymethyl)phosphine. |
| XIII | Bis(3-cyclohexenyl)-bis(hydroxymethyl)phosphonium chloride. | N,N-dimethylaniline. | 1:1 | Ethanol | –10 | Bis(3-cyclohexenyl)hydroxymethylphosphine. |
| XIV | Tris(hydroxymethyl)octadecylphosphonium bromide. | Pyridine | 1:1 | Butanol | 15 | Bis(hydroxymethyl)octadecylphosphine. |
| XV | Bis(4-chlorophenyl)-bis(hydroxymethyl)phosphonium chloride. | Na$_2$CO$_3$ | 1:1 | Ethanol | 10 | Bis(4-chlorophenyl)hydroxymethylphosphine. |
| XVI | Tris(hydroxymethyl)-4-methylphenylphosphonium iodide. | BaO | 1:1 | H$_2$O | 30 | Bis(hydroxymethyl)-4-methylphenylphosphine. |
| XVII | Bis(4-butoxyphenyl)-bis(hydroxymethyl)phosphonium chloride. | NaHCO$_3$ | 1:1 | H$_2$O | 0 | Bis(4-butoxyphenyl)hydroxymethylphosphine. |
| XVIII | 3-propoxyhexyl-tris(hydroxymethyl)phosphonium chloride. | Ca(OH)$_2$ | 1:1 | Ethanol | 25 | 3-propoxyhexyl-bis(hydroxymethyl)phosphine. |
| XIX | Tris(hydroxymethyl)-3-propylphenylphosphonium bromide. | Triethylamine | 1:1 | H$_2$O | 20 | Bis(hydroxymethyl)-3-propylphenylphosphine. |
| XX | 2-butylphenyl-tris(hydroxymethyl)phosphonium iodide. | CaO | 1:1 | Propanol | 25 | 2-butylphenyl-bis(hydroxymethyl)phosphine. |
| XXI | Bis(4-fluorophenyl)-bis(hydroxymethyl)phosphonium chloride. | NaOC$_2$H$_5$ | 1:1 | Methanol | 23 | Bis-(4-fluorophenyl)hydroxymethylphosphine. |
| XXII | Bis(3-bromophenyl)-bis(hydroxymethyl)phosphonium chloride. | N,N-dimethylaniline. | 1:1 | Butanol | 25 | Bis(3-bromophenyl)hydroxymethylphosphine. |
| XXIII | 4-ethoxyphenyl-tris(hydroxymethyl)phosphonium sulfate. | Na$_2$CO$_3$ | 1:1 | H$_2$O | 65 | 4-ethoxyphenyl-bis(hydroxymethyl)phosphine. |

Examples XXIV–XXXVI

The following examples illustrate the conversion of the hydroxymethyl phosphines contemplated herein to their corresponding phosphonium halides according to the equation:

$$R_qP(CH_2OH)_{3-q} + R''X \rightarrow [R''R_qP(CH_2OH)_{3-q}]^\oplus X^\ominus$$

of any of these phosphines or a mixture of these phosphines, such as tris(hydroxymethyl)phosphine, hydroxymethyldiphenylphosphine, or the like, in one gallon of gasoline affords protection against misfiring, surface ignition and the like.

Clearly the instant discovery encompasses numerous modifications within the skill of the art. Consequently,

TABLE II

| Example | Reactants | | Molar ratio, hydroxymethylphosphine: alkyl halide | Solvent | Temp., °C. | Product |
|---|---|---|---|---|---|---|
| | Hydroxymethylphosphine | Alkyl halide | | | | |
| XXIV | Tris(hydroxymethyl)phosphine | $C_2H_5Cl$ | 1:1 | Water | 22 | Ethyl-tris(hydroxymethyl)phosphonium chloride. |
| XXV | Bis(hydroxymethyl)methylphosphine | $C_8H_{17}Br$ | 1:1.5 | Ethanol | 15 | Bis(hydroxymethyl)octylmethylphosphonium bromide. |
| XXVI | (Hydroxymethyl)diphenylphosphine | $C_{12}H_{25}Cl$ | 1.5:1 | Isopropanol | 30 | (Hydroxymethyl)dodecyldiphenylphosphonium chloride. |
| XXVII | Cyclohexylbis(hydroxymethyl)phosphine | $C_{18}H_{37}Cl$ | 1:1 | Methanol | 40 | Cyclohexylbis(hydroxymethyl)octadecylphosphonium chloride. |
| XXVIII | 4-ethoxybutyl-bis(hydroxymethyl)phosphine | $C_3H_7Cl$ | 1:1 | Propanol | 8 | 4-ethoxybutyl-bis(hydroxymethyl)propylphosphonium chloride. |
| XXIX | 2-cyanoethyl-bis(hydroxymethyl)phosphine | $CH_3I$ | 1:1 | Acetonitrile | 20 | 2-cyanoethyl-bis(hydroxymethyl)methylphosphonium iodide. |
| XXX | Bis(hydroxymethyl)-3-propoxyhexylphosphine | $C_5H_{11}I$ | 1:1 | Methanol | 35 | Bis(hydroxymethyl)pentyl-3-propoxyhexylphosphonium iodide. |
| XXXI | Bis(hydroxymethyl)-3-propylphenylphosphine | $C_4H_9Cl$ | 1.5:1 | Propanol | 15 | Butyl-bis(hydroxymethyl)-3-propylphenylphosphonium chloride. |
| XXXII | 2-butylphenyl-bis(hydroxymethyl)phosphine | $CH_3Cl$ | 1:1 | Isopropanol | 40 | 2-butylphenyl-bis(hydroxymethyl)methylphosphonium chloride. |
| XXXIII | Bis(4-fluorophenyl)hydroxymethylphosphine | $C_7H_{15}Br$ | 1:1 | Ethanol | 30 | Bis(4-fluorophenyl)heptyl-hydroxymethylphsophonium bromide. |
| XXXV | 3-bromophenyl-bis(hydroxymethyl)phosphine | $C_5H_{11}Br$ | 1:1 | Methanol | 38 | 3-bromophenyl-bis(hydroxymethyl)pentylphosphonium bromide. |
| XXXVI | Bis(4-ethoxyphenyl)hydroxymethylphosphine | $C_4H_9Cl$ | 1:1 | Ethanol | 30 | Butyl-bis(4-ethoxyphenyl)hydroxymethylphosphonium chloride. |

Examples XXXVII–XLV

The following examples illustrates the reaction of a hydrohalide, a substituted or unsubstituted phenylphosphine or diphenylphosphine according to the equation:

$$R_xR'_yP(H)_{3-(x+y)} + 4\text{-}(x+y)CH_2O + HY \xrightarrow{H_2O} [R_xR'_yP(CH_2OH)_{4-(x+y)}]^\oplus Y^\ominus$$

while the present invention has been described in detail with respect to specific embodiments thereof, it is not intended that these details be construed as limitations upon the scope of the invention, except insofar as they appear in the appended claims.

I claim:

1. A hydroxymethylphosphine having the formula $$R_xR'_yP(CH_2OH)_{3-(x+y)}$$

TABLE III

| Example | Reactants | | | Molar Ratio of Reactants | Temperature, °C. | Product |
|---|---|---|---|---|---|---|
| | Phenylphosphine | $CH_2O$ | HX | | | |
| XXXVII | Phenylphosphine | $CH_2O$ | HCl | 1:3:1 | 22 | Tris(hydroxymethyl)phenylphosphonium chloride. |
| XXXVIII | Diphenylphosphine | $CH_2O$ | HCl | 1:2:1 | 22 | Bis(hydroxymethyl)diphenylphosphonium chloride. |
| XXXIX | Bis(4-chlorophenyl)phosphine | $CH_2O$ | HBr | 1:3:1 | 5 | Bis(4-chlorophenyl)-bis(hydroxymethyl)phosphonium bromide. |
| XL | Bis(4-butoxyphenyl)phosphine | $CH_2O$ | HI | 1:4:1 | 40 | Bis(4-butoxyphenyl)-bis(hydroxymethyl)phosphonium iodide. |
| XLI | 4-methylphenylphosphine | $CH_2O$ | HCl | 1:3:1 | 10 | Tris(hydroxymethyl)-4-methylphenylphosphonium chloride. |
| XLII | Bis(4-ethoxyphenyl)phosphine | $CH_2O$ | HCl | 1:3:1 | 15 | Bis(4-ethoxyphenyl)-bis(hydroxymethyl)phosphonium chloride. |
| XLIII | 3-propylphenylphosphine | $CH_2O$ | HBr | 1:3:1 | 12 | Tris(hydroxymethyl)-3-propylphenylphosphonium bromide. |
| XLIV | Bis(3-bromophenyl)phosphine | $CH_2O$ | HCl | 1:3:1 | 35 | Bis(3-bromophenyl)-bis(hydroxymethyl)phosphonium chloride. |
| XLV | Bis(4-fluorophenyl)phosphine | $CH_2O$ | HCl | 1:4:1 | 15 | Bis(4-fluorophenyl)-bis(hydroxymethyl)phosphonium chloride. |

It follows from the above examples that typical substituents, when R and R' represent alkyl ($C_1$–$C_{20}$), are cyano and lower alkoxy ($C_1$–$C_4$); when R and R' represent phenyl, typical substituents are lower alkoxy ($C_1$–$C_4$), lower alkyl ($C_1$–$C_4$) and halo (e.g. Cl, Br and F); and when R and R' represent cycloalkyl a typical substituent is hydroxy.

The hydroxymethyl phosphines $$R_xR'_yP(CH_2OH)_{3-(x+y)}$$

prepared according to the present invention are useful as gasoline additives. For example, up to about 10 milliliters wherein R and R' represent the same and different members selected from the group consisting of alkyl having from 1 to 20 carbon atoms; substituted alkyl having from 1 to 20 carbon atoms; alkenyl having from 2 to 20 carbon atoms; said substituents for alkyl being selected from the group consisting of cyano and lower alkoxy; cyclohexyl; hydroxy-substituted cyclohexyl; cyclohexenyl; phenyl; substituted phenyl; said substituents for phenyl being selected from the group consisting of lower alkoxy, lower alkyl and halo; $x$ is selected from 0 and 1; $y$ is selected from 0 and 1; and the sum of $x$ plus $y$ is selected from 1 and 2.

2. Bis(hydroxymethyl)methylphosphine.
3. 2-cyanoethyl-bis(hydroxymethyl)phosphine.
4. Bis(hydroxymethyl)-4-methylphenylphosphine.
5. 2-cyanoethyl - bis(hydroxymethyl)methylphosphonium chloride.
6. 4-ethoxybutyl - bis(hydroxymethyl)propylphosphonium chloride.
7. A method which comprises bringing into reactive contact in the temperature range of —20° C. to 100° C., in the presence of a member selected from the group consisting of water and a lower alkyl alcohol, a base selected from the group consisting of the oxides, hydroxides, lower alkoxides and carbonates of alkali metals and alkaline earth metals and strongly basic organic tertiary amines selected from the group consisting of tertiary alkyl amines, tertiary aralkyl amines and tertiary heterocyclic amines, and a hydroxymethyl phosphonium salt of the formula $$[R_xR'_yP(CH_2OH)_{4-(x+y)}]^\oplus Y^\ominus$$

and recovering the corresponding hydroxymethyl phosphine having the formula $$R_xR'_yP(CH_2OH)_{3-(x+y)}$$

said base being present in the reaction mixture in about a stoichiometric quantity throughout substantially all of the reaction; R and R' in the above formulae each represent a member selected from the group consisting of alkyl having from 1 to 20 carbon atoms; substituted alkyl having from 1 to 20 carbon atoms; alkenyl having from 2 to 20 carbon atoms; said substituents for alkyl being selected from the group consisting of cyano, and lower alkoxy; cyclohexyl; hydroxy-substituted cyclohexyl; cyclohexenyl; phenyl; substituted phenyl; said substituents for phenyl being selected from the group consisting of lower alkoxy, lower alkyl, and halo; Y is a mineral acid residue; $x$ is selected from 0 and 1; and $y$ is selected from 0 and 1.

8. A method which comprises bringing tetrakis-(hydroxymethyl)phosphonium chloride into reactive contact in the temperature range of —20° C. to 100° C., in the presence of a member selected from the group consisting of water and a lower alkyl alcohol, with a base selected from the group consisting of the oxides, hydroxides, lower alkoxides and carbonates of alkali metals and alkaline earth metals and strongly basic organic tertiary amines selected from the group consisting of tertiary alkyl amines, tertiary aralkyl amines and tertiary heterocyclic amines, said base being present in the reaction mixture in about a stoichiometric quantity throughout substantially all of the reaction, and recovering tris(hydroxymethyl)phosphine.

9. A method which comprises bringing bis(hydroxymethyl)diphenylphosphonium chloride into reactive contact in the temperature range of —20° C. to 100° C., in the presence of a member selected from the group consisting of water and a lower alkyl alcohol, with a base selected from the group consisting of the oxides, hydroxides, lower alkoxides and carbonates of alkali metals and alkaline earth metals and strongly basic organic tertiary amines selected from the group consisting of tertiary alkyl amines, tertiary aralkyl amines and tertiary heterocyclic amines, said base being present in the reaction mixture in about a stoichiometric quantity throughout substantially all of the reaction, and recovering (hydroxymethyl)diphenylphosphine.

10. A method which comprises bringing cyclohexyl-tris(hydroxymethyl)phosphonium chloride into reactive contact in the temperature range of —20° C. to 100° C., in the presence of a member selected from the group consisting of water and a lower alkyl alcohol, with a base selected from the group consisting of the oxides, hydroxides, lower alkoxides and carbonates of alkali metals and alkaline earth metals and strongly basic organic tertiary amines selected from the group consisting of tertiary alkyl amines, tertiary aralkyl amines and tertiary heterocyclic amines, said base being present in the reaction mixture in about a stoichiometric quantity throughout substantially all of the reaction, and recovering cyclohexyl-bis(hydroxymethyl)phosphine.

11. The process of claim 7 wherein the base is added to the hydroxymethyl phosphonium salt reactant.

12. The process of claim 7 wherein the base is an alkali metal hydroxide.

13. The process of claim 7 wherein the base is an alkaline earth metal oxide.

14. The process of claim 7 wherein the base is a lower alkali metal alkoxide.

15. The process of claim 7 wherein the base is a strongly basic organic tertiary amine selected from the group consisting of tertiary alkyl amines, tertiary aralkyl amines and tertiary heterocyclic amines.

No references cited.

CHARLES B. PARKER, *Primary Examiner.*

JOSEPH P. BRUST, *Assistant Examiner.*